United States Patent [19]

Rupilius et al.

[11] 4,055,492
[45] Oct. 25, 1977

[54] PROCESS FOR THE EXTRACTION OF HEAVY METALS FROM DILUTED AQUEOUS HEAVY METAL SALT SOLUTIONS

[75] Inventors: Wolfgang Rupilius; Werner Stein, both of Dusseldorf, Germany

[73] Assignee: Henkel Kommanditgesellschaft auf Aktien, Dusseldorf, Germany

[21] Appl. No.: 700,865

[22] Filed: June 29, 1976

[30] Foreign Application Priority Data

July 7, 1975 Germany .............................. 2530244

[51] Int. Cl.² .............................................. B01D 11/04
[52] U.S. Cl. ........................................ 210/21; 423/24
[58] Field of Search ........... 75/101 BE; 210/21, 38 B, 210/44; 252/392; 260/348 R, 268 R; 423/24, 139

[56] References Cited

U.S. PATENT DOCUMENTS

| | | | |
|---|---|---|---|
| 2,909,542 | 10/1959 | Soloway | 210/21 X |
| 3,215,622 | 11/1965 | Dunning et al. | 210/21 |
| 3,872,116 | 3/1975 | Gipson | 260/348 R X |
| 3,932,274 | 1/1976 | Izumi et al. | 210/44 |
| 3,933,971 | 1/1976 | Baucom | 423/139 X |

*Primary Examiner*—Wilbur L. Bascomb, Jr.
*Assistant Examiner*—Robert H. Spitzer
*Attorney, Agent, or Firm*—Hammond & Littell

[57] ABSTRACT

A process for the extraction of heavy metal ions capable of forming complexes with amines from dilute aqueous heavy metal salt solutions consisting essentially of the steps of
a. dissolving from 2% to 15% by weight, based on the weight of the dilute aqueous heavy metal salt solution, of at least one vicinal aminoalkanol of the formula

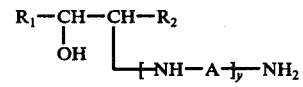

wherein $R_1$ and $R_2$ are unbranched alkyl having from 1 to 17 carbon atoms and the sum of the carbon atoms in $R_1 + R_2$ is from 7 to 18, A is a member selected from the group consisting of alkylene having from 2 to 6 carbon atoms and methylalkylene having from 3 to 7 carbon atoms, and $y$ is an integer from 1 to 2, with the proviso that the vicinal substituents are distributed statistically, in a dilute aqueous heavy metal salt solution in the absence of organic solvents, at a temperature below the turbidity temperature of said vicinal aminoalkanols;
b. heating the solution to a temperature of at least 10° C above said turbidity temperature whereby two liquid phases are formed, and
c. separating the organic phase containing the heavy metal ion.

6 Claims, No Drawings

PROCESS FOR THE EXTRACTION OF HEAVY METALS FROM DILUTED AQUEOUS HEAVY METAL SALT SOLUTIONS

RELATED ART

It is known to use long chain, branched or unbranched, aliphatic amines as agents for extracting heavy metal ions from dilute aqueous heavy metal salt solutions. The amines are dissolved in inert organic solvents immiscible with water and are thus able to extract heavy metal ions from the aqueous phase in a two-phase reaction in that the heavy metal ions are exchanged in the form of anionic metal complexes for other anions, for example, chloride ions or sulfate ions, and are bound as ammonium salts in the organic phase. Owing to the fact that their properties are similar to those of ion exchange resins, such amines are also designated "liquid ion exchangers."

A disadvantage of the known extraction process is that the rate of extraction of the heavy metal complex into the organic phase is slow, since it is determined substantially by transport phenomena such as diffusion and phase boundary transition stages. Furthermore, the two-phase system is usually impaired by the fact that the complex ammonium salts formed have a low degree of solubility in organic solvents.

A further disadvantage of the process is that, in order to form the anionic metal complexes, it is usually necessary to acidify the aqueous solutions to a greater or lesser extent, chiefly with mineral acids such as hydrochloric acid.

OBJECTS OF THE INVENTION

An object of the present invention is the development of a process by means of which it is possible to extract heavy metal salts from diluted aqueous solutions in a rapid and economic manner.

Another object of the present invention is the development of a process for the extraction of heavy metal ions capable of forming complexes with amines from dilute aqueous heavy metal salt solutions consisting essentially of the steps of a. dissolving for 2% to 15% by weight, based on the weight of the dilute aqueous heavy metal salt solution, of at least one vicinal aminoalkanol of the formula

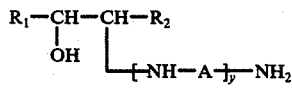

wherein $R_1$ and $R_2$ are unbranched alkyl having from 1 to 17 carbon atoms and the sum of the carbon atoms in $R_1 + R_2$ is from 7 to 18, A is a member selected from the group consisting of alkylene having from 2 to 6 carbon atoms and methylalkylene having from 3 to 7 carbon atoms, and $y$ is an integer from 1 to 2, with the proviso that the vicinal substituents are distributed statistically, in a dilute aqueous heavy metal salt solution in the absence of organic solvents, at a temperature below the turbidity temperature of said vicinal aminoalkanols;

b. heating the solution to a temperature of at least 10° C above said turbidity temperature whereby two liquid phases are formed, and c. separating the organic phase containing the heavy metal ion.

These and other objects of the present invention will become more apparent as the description thereof proceeds.

DESCRIPTION OF THE INVENTION

Accordingly the present invention provides a process for extracting heavy metal ions, which form complexes with amines, from dilute aqueous solutions, characterized by the following features:

a. vicinal aminoalkanols of the formula

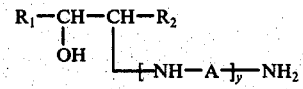

in which $R_1$ and $R_2$ are unbranched alkyl radicals having 1 to 17 carbon atoms, wherein the total of carbon atoms in $R_1$ and $R_2$ is 7 to 18, A is a member from the group of alkylene having 2 to 6 carbon atoms and methylalkylene having 3 to 7 carbon atoms, and $y$ can assume a value of 1 or 2, provided that the vicinal substituents are distributed statistically over the chain, are dissolved in a quantity of from 2% to 15% by weight in the dilute aqueous metal salt solution below the particular turbidity temperature of the aminoalkanols;

b. after the complexing of the heavy metals, the solution is heated to a temperature of 10° C or more above the turbidity temperature until two phases are formed, c. the organic phase containing the heavy metal salt is separated.

More particularly, the present invention relates to a process for the extraction of heavy metal ions capable of forming complexes with amines from dilute aqueous heavy metal salt solutions consisting essentially of the steps of a. dissolving from 2% to 15% by weight, based on the weight of the dilute aqueous heavy metal salt solution, of at least one vicinal aminoalkanol of the formula

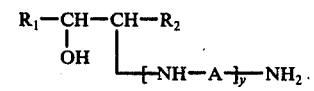

wherein $R_1$ and $R_2$ are unbranched alkyl having from 1 to 17 carbon atoms and the sum of the carbon atoms in $R_1 + R_2$ is from 7 to 18, A is a member selected from the group consisting of alkylene having from 2 to 6 carbon atoms and methylalkylene having from 3 to 7 carbon atoms, and $y$ is an integer from 1 to 2, with the proviso that the vicinal substituents are distributed statistically, in a dilute aqueous heavy metal salt solution in the absence of organic solvents, at a temperature below the turbidity temperature of said vicinal aminoalkanols;

b. heating the solution to a temperature of at least 10° C above said turbidity temperature whereby two liquid phases are formed, and c. separating the organic phase containing the heavy metal ion.

In the present instance, the term "tubidity temperature" refers to the temperature at which an aqueous solution, having a specific content of the vicinal aminoalkanols in accordance with the invention is rendered highly turbid, if necessary beyond a slight initial turbidity caused by impurities resulting from the method of manufacture. Preferably the same is measured with a 5% by weight aqueous solution.

The vicinal aminoalkanols employed are partially some of the broader disclosure of vicinal aminoalkanol mixtures described and claimed in the copending, commonly-assigned U.S. patent application Ser. No. 683,322, filed May 5, 1976. These vicinal aminoalkanols are produced by reacting non-terminal olefins with percompounds to give non-terminal epoxides; these epoxides are reacted with diamines to give the desired vicinal aminoalkanols.

Various olefins or olefin mixtures known per se are suitable as the starting material for manufacturing the vicinal aminoalkanols and mixtures in accordance with the invention. By way of example, olefin mixtures are employed which are produced by catalytic dehydrogenation or by chlorination/dehydrochlorination of paraffins having 9 to 20 carbon atoms and selective extraction of the monoolefin or monoolefin mixtures having a substantially non-terminal, statistically distributed double bond. By way of example, fractions having a high content of unbranched $C_{11}$ to $C_{18}$ olefins are converted from such commercially available mixtures.

Alternatively, however, olefins may be employed which constitute a mixture of position-isomeric, unbranched monoolefins of the same chain length, the non-terminal double bond being distributed, in total, statistically over the chain. A suitable statistical mixture of this type is, for example, a mixture of unbranched dodecene isomers.

By means of known processes, for example, by means of peracids such as peracetic acid, the monoolefins are reacted with the statistically distributed non-terminal double bonds to form corresponding epoxides from which the aminoalkanols in accordance with the invention are produced in a known manner by reaction with diamines or triamines such as ethylene diamine, propylene diamine, tetramethylene diamine, pentamethylene diamine, hexamethylene diamine, diethylene triamine, dipropylene triamine, ditetramethylene triamine, dipentamethylene triamine, and dihexamethylene triamine.

Aminoalkanol mixtures, produced by reacting corresponding epoxide mixtures having chain lengths of from 11 to 14 carbon atoms and ethylene diamine, have proved to be particularly suitable for carrying out the process in accordance with the invention, so that, in the general formula, the total of $R_1$ and $R_2$ represents 9 to 12 carbon atoms, A is ethylene or 1,2-propylene and $y$ equals 1.

In accordance with the preferred embodiment, an amount preferably from 4% to 10% by weight of these aminoalkanol mixtures is dissolved in the diluted aqueous metal salt solution at room temperature, a metal/amine complex immediately being formed. This complex probably has the following structure in which $R_1$, $R_2$ and A have the meaning given above and Me represents the complexed heavy metal atom.

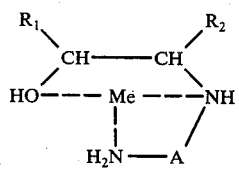

After the formation of the complex, in other words, after the complete dissolution of the aminoalkanol, the temperature is increased preferably to 45° C to 70° C and maintained until two phases are formed. The organic aminoalkanol phase, in which virtually all the heavy metal ions are contained, is separated from the aqueous phase. If required, residual contents of aminoalkanol can be recovered by, for example, foam fractionation from the aqueous phase.

The heavy metals can be separated from the complexes by various processes known per se, for example, by hydrogen sulfide precipitation or electrolytically.

A substantial advantage of the extraction process in accordance with the invention is that the heavy metal complex is formed in a homogenous phase and takes place very rapidly.

Furthermore, no organic solvents are needed when the products are used in accordance with the invention. Also, it is possible to form the heavy metal complex by aminoalkanol mixtures in slightly acid, neutral or alkaline pH range, so that it is generally unnecessary to use acids for regulating the pH value or to form heavy metal anions.

A further advantage of the invention is that the application of the aminoalkanol mixtures does not give rise to the problems encountered with the amines of the prior art, owing to the fact that their amine odor is weaker than that of long chain aliphatic amines and owing to their improved skin compatibility, as described in Ser. No. 683,322.

The present invention will now be further described with reference to the following examples which are not limitative in any manner.

EXAMPLE 1

A mixture of 198 gm (about 1 mol) of a $C_{11}$–$C_{14}$ epoxide was stirred in a 2-liter three-necked flask equipped with thermometer, reflux condenser and stirrer, with 480 gm (8 mols) of ethylene diamine for 24 hours at reflux temperature. Subsequently, the excess ethylene diamine was distilled off under atmospheric pressure. The $C_{11}$–$C_{14}$ vicinal hydroxy diamine, Product A, was separated by distillation from higher boiling components. The yield is 220 gm of Product A, corresponding to 88% of theory.

Boiling range — 129° to 133° C/0.1 Torr.
Index of refraction at 20° C — 1.4688
Amine number — Found 444, Calculated 448.

The products listed in the table below were also produced according to Example 1.

| Product | Epoxide Mixture | Amine |
| --- | --- | --- |
| A | $C_{11}$–$C_{14}$ | ethylene diamine |
| B | $C_{11}$–$C_{14}$ | propylene diamine |
| C | $C_{15}$–$C_{18}$ | diethylene triamine |
| D | $C_{12}$ | ethylene diamine |

The chain length distributions of the commercially available epoxide mixtures used for manufacturing the products A to C were:

| | |
| --- | --- |
| a) | $C_{11}$–$C_{14}$ Fractions (in percent by weight) |
| | $C_{11}$ olefins, non-terminal approx. 22 |
| | $C_{12}$ olefins, non-terminal approx. 30 |
| | $C_{13}$ olefins, non-terminal approx. 26 |
| | $C_{14}$ olefins, non-terminal approx. 22 |
| b) | $C_{15}$–$C_{18}$ Fractions (in percent by weight) |
| | $C_{15}$ olefins, inner position approx. 26 |
| | $C_{16}$ olefins, inner position approx. 35 |
| | $C_{17}$ olefins, inner position approx. 31 |
| | $C_{18}$ olefins, inner position approx. 6 |

EXAMPLE 2

Based on 5% aqueous solutions, the residual solubilities of the aminoalkanol products A to D manufactured were determined at various temperatures. The results are given in the following Table 1, together with the turbidity temperatures of the 5% aqueous solutions.

TABLE 1

| Product | Residual Concentration in Water Phase (percent by weight) | | | | | | Turbidity Temperature (° C) |
|---|---|---|---|---|---|---|---|
| | 5° C | 23° C | 30° C | 50° C | 70° C | 90° C | |
| A | 5 | 5 | 0.8 | 0.31 | 0.25 | 0.26 | approx. 26 |
| B | 5 | 5 | 5 | 0.61 | 0.34 | 0.34 | 32 |
| C | 5 | 5 | 5 | 3.6 | 1.2 | 0.59 | 48 |
| D | 5 | 0.26 | 0.25 | 0.22 | 0.22 | 0.20 | 8 |

EXAMPLE 3

5 gm of aminoalkanol mixture A were dissolved in a 95 gm of a dilute copper sulfate solution (0.14% by weight of Cu-II) in a heatable burette at room temperature. The homogenous dark blue solution was then heated to 70° C after formation of the complex. Two phases are immediately formed, and the lighter, organic phase, containing the complexed copper ions, was separated. Analysis of the aqueous phase shows a residual content of 0.0013% by weight of copper-II ions.

Further experiments carried out in accordance with this example are given in the following Table 2.

TABLE 2

| Aminoalkanol Mixture | | Heavy Metal Salt Solution | | | Residual heavy metal salt content (wt %) | Phase Separation Temperature (° C) |
|---|---|---|---|---|---|---|
| Quantity (gm) | Product | Quantity (gm) | Salt | Initial Content (wt %) | | |
| 5 | B | 95 | CuSO$_4$ | 0.037 | 0.0008 | 70 |
| 5 | A | 95 | FeSO$_4$ | 0.021 | 0.00072 | 50 |
| 5 | A | 95 | Fe$_2$(SO$_4$)$_3$ | 0.022 | 0.00008 | 70 |
| 10 | A | 125 | Ni(NO$_3$)$_2$ | 0.15 | 0.003 | 75 |
| 5 | B | 100 | CrCl$_3$ | 0.02 | 0.00018 | 80 |

EXAMPLE 4

10 gm of the substance C (reaction product of 1 mol of C$_{15}$–C$_{18}$ epoxide mixture and diethylene triamine, having a turbidity temperature of about 48° C) were dissolved in 100 gm of a dilute iron sulfate solution (0.057% by weight of Fe-III) at room temperature. The homogenous solution was heated to 90° C after formation of the complex, wherein two phases were formed. The organic phase containing the complexed iron ions was subsequently separated. Analysis of the aqueous phase shows a residual content of 0.0031% by weight of iron-III ions.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the extraction of heavy metal ions capable of forming complexes with amines from dilute aqueous heavy metal salt solutions cnsisting essentially of the steps of
   a. dissolving from 2% to 15% by weight, based on the weight of the dilute aqueous heavy metal salt solution, of at least one vicinal aminoalkanol of the formula

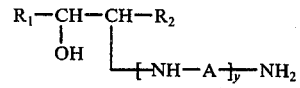

wherein R$_1$ and R$_2$ are unbranched alkyl having from 1 to 17 carbon atoms and the sum of the carbon atoms in R$_1$ and R$_2$ is from 7 to 18, A is a member selected from the group consisting of alkylene having from 2 to 6 carbon atoms and methylalkylene having from 3 to 7 carbon atoms, and y is an integer from 1 to 2, with the proviso that the vicinal substituents are distributed statistically, in a dilute aqueous heavy metal salt solution in the absence of organic solvents, at a temperature below the turbidity temperature of said vicinal aminoalkanols;
   b. heating the solution to a temperature of at least 10° C above said turbidity temperature whereby two liquid phases are formed, and
   c. separating the organic phase containing the heavy metal ion.

2. The process of claim 1 wherein the sum of the carbon atoms in R$_1$ + R$_2$ is from 9 to 12, A is ethylene and y is 1.

3. The process of claim 1 wherein the sum of the carbon atoms in R$_1$ + R$_2$ is from 9 to 12, A is 1,2-propylene and y is 1.

4. The process of claim 1 wherein from 4% to 10% by weight of said vicinal aminoalkanols are employed.

5. The process of claim 1 wherein said dissolving step (a) is conducted at room temperature.

6. The process of claim 1 wherein said vicinal aminoalkanols have a turbidity temperature when measured at a 5% by weight aqueous solution of between 25° and 40° C and said heating step (b) is to a temperature between about 50° and 90° C.

* * * * *